United States Patent Office 2,924,712
Patented Feb. 9, 1960

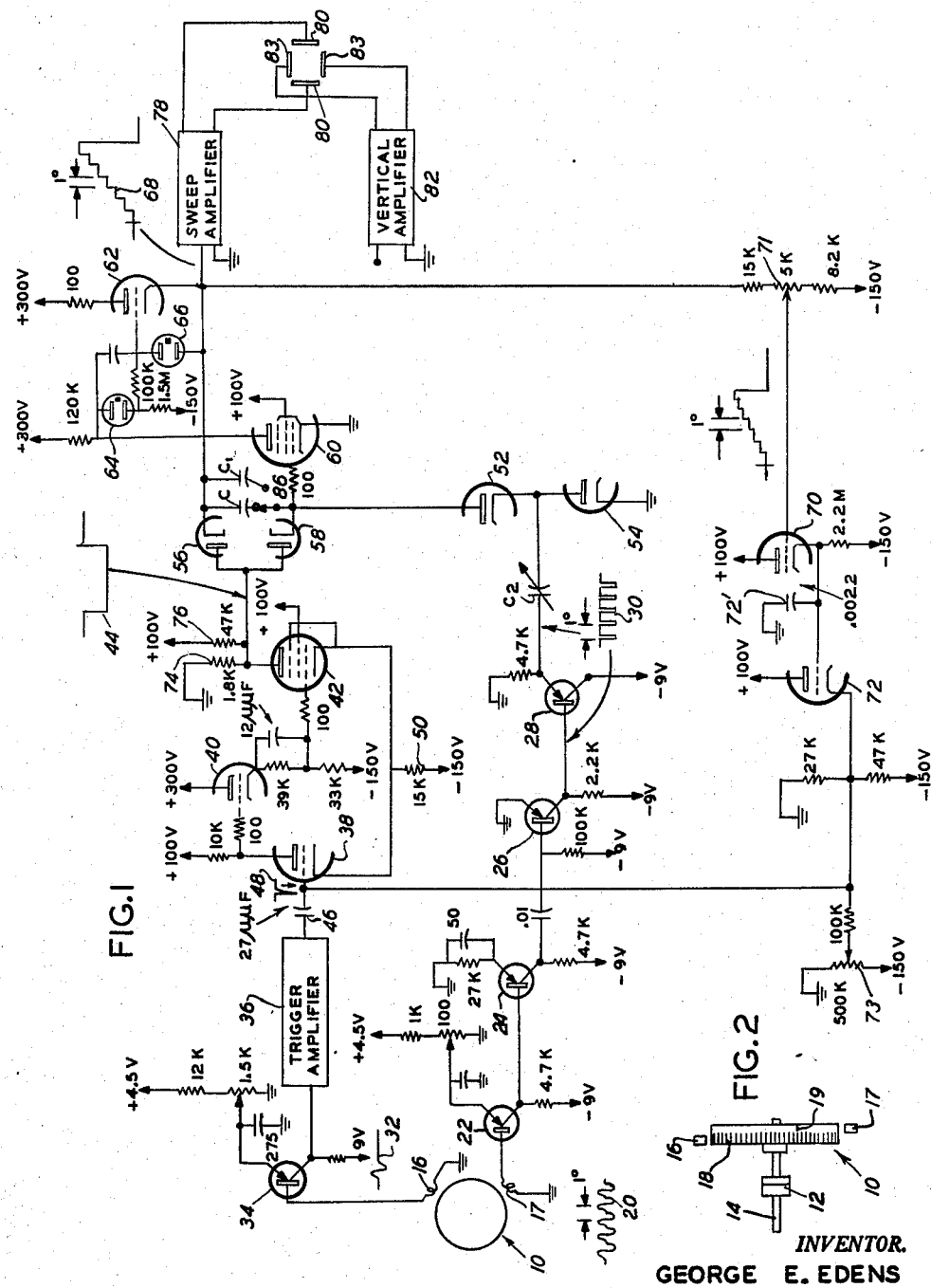

2,924,712

SWEEP VOLTAGE GENERATOR

George E. Edens, Elmwood Park, Ill., assignor to Tektronix, Inc., Portland, Oreg., a corporation of Oregon Application September 23, 1957, Serial No. 685,473

10 Claims. (Cl. 250—27)

This invention relates to a sweep voltage generator and more particularly to apparatus for generating a voltage which is accurately proportional to the displacement of a movable member from a predetermined position.

It is many times desirable to be able to observe various dynamic conditions such as pressure, velocity, torque or vibration, as a function of another variable. The dynamic conditions referred to can be converted into electric signals by means of suitable transducers and such signals can be amplified and displayed either on a visual or a recording instrument, for example, an oscilloscope. Such an instrument usually displays the desired quantities as a function of time. In many cases, however, it is desirable to observe a desired quantity as a function of the position of a movable member as determined by its linear or angular displacement from a predetermined position. This is particularly true when the velocity of the movable member is not uniform during the interval when the quantity is being observed or when a number of observations are required at varying speeds of the movable member.

The device of the present invention is particularly useful in a rotation analyzer for producing a sweep voltage for an oscilloscope. Such sweep voltage may be made accurately proportional to the angular displacement of a rotating element, for example, the crank shaft or camshaft of an internal combustible engine, where the quantities to be observed may be cylinder pressure, ignition timing, or output torque, or may be vibration of any of various elements. If the usual sweep voltage proportional to time is employed, frequent readjustment of the oscilloscope is required for tests in which the engine is run at different speeds and also it is difficult, if not impossible, to interpret the results obtained from tests during which the speed of the engine is varied. By developing a sweep voltage which is proportional to angular displacement of a rotating element of the engine from a predetermined position, the quantities to be observed can be displayed as a function of the instantaneous position of the element regardless of the speed of the internal combustion engine or variations of such speed. While the apparatus of the present invention is particularly suitable for analyzing rotating machines, such as internal combustion engines, its principle can be applied to analyzing devices involving reciprocating motion in which the voltage developed is accurately proportional to the displacement of a reciprocating member from a predetermined position.

In accordance with the present invention, equally spaced markers are positioned on an element which can be attached to a movable member of the machine to be analyzed. Such markers are spaced equal predetermined distances apart in the direction of movement of the element and a pickup is positioned adjacent the markers so that a voltage pulse is produced in the pickup by the passing of each marker past the pickup. Such voltage pulses will, in general, vary in amplitude depending upon the relative velocity of the markers and the pickup. In accordance with the present invention, such voltage pulses are first amplified and then shaped to produce pulses which correspond to the initial voltage pulses but which are of constant amplitude. Such pulses are then integrated in an integration circuit to produce a voltage which is accurately proportional to the displacement of the movable member from a predetermined position.

The predetermined position referred to is established by a trigger marker also carried by the movable element in conjunction with a second pickup positioned adjacent such movable element. A voltage pulse is produced whenever the last mentioned marker passes such pickup. For example, a trigger marker may pass its associated pickup once in each revolution of the rotating member and the resulting pulse is amplified and employed to trigger the integration circuit discussed above so as to start the integrating operation. The resulting integrated votage can be employed as a control voltage to stop the integrating operation and to reduce the integrated voltage to zero when such integrated voltage reaches a predetermined value to thereby condition the apparatus for a new trigger pulse again starting the integrating operation. The result is a sweep voltage which is accurately proportional to the displacement of the movable element from a predetermined position and such sweep voltage may be amplified and applied to the horizontal deflection plates of a cathode ray oscilloscope tube to provide a distance based sweep instead of a time based sweep.

It is therefore an object of the present invention to provide a sweep voltage generator which generates a voltage accurately proportional to the displacement of a movable member from a predetermined position.

Another object of the invention is to provide a sweep voltage generator in which voltage pulses of variable amplitude are derived by movement of equally spaced markers past a pickup and such pulses are brought to a constant amplitude and then integrated to produce a voltage which is proportional to the distance moved by a movable member from a predetermined position.

A further object of the invention is to provide a sweep voltage generator in which pulses of variable amplitude are derived from equally spaced markers on an element moving past a pickup and are amplified and converted to pulses of uniform amplitude and thereafter integrated and a trigger marker also upon the movable element is employed to produce a pulse initiating such integration.

A still further object of the invention is to provide an apparatus for generating a voltage proportional to the displacement of a movable member from a predetermined position in which pulses corresponding to predetermined equal increments of movement of the movable member are brought to the same amplitude and then integrated to produce a voltage proportional to displacement of the movable member from a predetermined position and in which such integration is initiated by another pulse produced when such member passes through a predetermined position and is discontinued when the integrated voltage reaches a predetermined value.

Other objects and advantages of the invention will appear in the following description of the preferred embodiment given in connection with the attached drawings in which:

Fig. 1 is a schematic diagram of the circuit of a device in accordance with the present invention; and Fig. 2 is a diagrammatic view of the marker drum of the device of Fig. 1.

Referring to the drawings, the embodiment of the invention shown therein is particularly suitable for generating a sweep voltage from a rotating member. The device of the drawings includes a drum 10 which may be connected to a rotating part, such as a crankshaft or camshaft, through a flexible connection 12 and a shaft 14. It will be understood that the drum 10 will be mounted in suitable bearings (not shown). Magnetic pickup elements 16 and 17 are shown diagrammatically in Fig. 2 as being positioned adjacent the periphery of the drum 10 and such drum may have a coating of suitable magnetic material, such as ferrite, on its periphery in which, for example, one degree markers 18 may be produced magnetically in alignment with the pickup 17 and a one revolution marker 19 produced magnetically in alignment with the pickup 16. The markers 18 and 19 are indicated as lines in Fig. 2 although they would not, in fact, be visible on the surface of the drum since they consist of small magnetized areas in the coating of magnetic material. Upon rotation of the drum 10 relative to the pickup elements, one degree voltage pulses 20, which are shown diagrammatically adjacent the pickup element 17 in Fig. 1, are produced in the pickup 17, each of the pulses 20 corresponding to the passage of one of the one degree markers past the pickup.

The pulses 20 induced in the pickup element 17 are amplified and converted to square wave pulses of standard amplitude in a circuit including transistors 22, 24, 26 and 28 to produce pulses 30, the form of which is shown adjacent the output of the transistor 28. The pulses 20 will vary in amplitude depending upon the speed of the drum 10. The pulses 30 each correspond to a pulse 20 but are of uniform amplitude regardless of the amplitude of the pulses 20. That is to say, the transistor 26 is biased to saturation and the transistors 22 and 24 are connected in cascade as voltage amplifiers so as to amplify the pulses 20 sufficiently to drive the transistor 26 to cut off. The transistor 28 is connected as an emitter follower taking its input from the collector circuit of transistor 26 to thus provide a low impedance input to a pulse integrating circuit described below. The resulting pulses 30 of uniform amplitude and each corresponding to movement of a one degree marker on the drum 10 past the pickup 17 are delivered through a coupling capacitor $C_2$ to such pulse integrating circuit.

The one revolution marker pulse 32 induced in the pickup 16 is of the form shown adjacent the pickup 16 and this pulse is amplified and employed to trigger the operation of the integrating circuit above referred to, the triggering circuit including a transistor 34, a trigger amplifier 36 and three vacuum tubes 38, 40 and 42 forming a bi-stable multivibrator circuit having an output voltage 44 of the form shown adjacent the plate of the tube 42. The transistor 34 is connected as a voltage amplifier and has its collector connected to the input of the trigger amplifier 36 which may be a conventional amplifier employing suitable vacuum tubes (not shown). The output of the trigger amplifier is delivered to the control grid of the tube 38 through a coupling capacitor 46 and provides a negative pulse 48 of the form shown adjacent the tube 38. As stated above, the circuit including the tubes 38, 40 and 42 is a bistable circuit. In the first stable condition of the circuit, the tube 38 is conducting and its plate is at a negative potential with respect to its potential in the non-conducting condition of such tube. This negative voltage is applied through tube 40 connected as a cathode follower to the grid of the tube 42 so as to bias such tube to cut off. The tube 42 therefore is non-conducting in such first stable condition of the bi-stable circuit.

When a negative pulse 48 is applied to the control grid of the tube 38 from the trigger amplifier 36, such tube is momentarily biased to cut off to cause the plate of such tube to assume a more positive potential to thereby apply a positive voltage to the control grid of the tube 42 through the cathode follower tube 40 sufficient to render tube 42 conducting. Resulting current flow through the cathode resistor 50, which is common to the cathodes of tubes 38 and 40, causes the cathode of tube 38 to assume a sufficiently positive potential that the tube remains cut off. Thus the bi-stable circuit assumes a second stable position with the tube 42 conducting and the tube 38 non-conducitng.

When the tube 42 becomes conducting, its plate becomes negative with respect to the potential on such plate when the tube 42 is non-conducting. The plate of the tube 42 remains at such negative potential until the bi-stable circuit including the tubes 38, 40 and 42 is returned to its first stable position. As described below, this return of the bi-stable circuit to its first stable position is controlled by a voltage from the integrating circuit also described below.

The integrating circuit includes a pair of coupling diodes 52 and 54, a pair of disconnect diodes 56 and 58, an integrating tube 60, a cathode follower output tube 62 and a pair of neon glow tubes 64 and 66 in the control grid circuit of the output tube 62. The plate of the tube 42 is connected to the plates of the disconnect diodes 56 and 58 and when the plate of the tube 42 assumes its more negative potential as a result of the second stable condition of the bi-stable circuit discussed above, the plates of the disconnect diodes 56 and 58 are carried sufficiently negative so that such diodes are non-conducting. An integrating capacitor $C_1$ is connected between the cathodes of the diodes 56 and 58 and is thus conditioned for being charged. Such capacitor has one terminal also connected to the control grid of the integrating tube 60 and also to the plate of the diode 52. The diode 54 has its cathode connected to ground and has its plate connected to the cathode of the diode 52 and to the terminal of the capacitor $C_2$ remote from the transistor 28. When a negative voltage pulse 30 is applied to the cathode of the diode 52 and to the plate of the diode 54, the diode 54 does not conduct but electrons flow through the diode 52 to apply such pulse to the control grid of the integrating tube 60.

The control grid of the tube 60 normally has a slight negative bias thereon so that such tube operates with a class A or linear characteristic. Each pulse 30 tends to drive the control grid of the tube 60 in a negative direction which means that the plate of such tube is driven in a positive direction. The resulting positive potential is applied to the control grid of the output tube 62 through the neon glow tube 64 which is normally conducting so as to maintain a constant voltage between its terminals. The neon glow tube 66 is normally non-conducting and is employed in the circuit merely to prevent the control grid of the tube 62 from being driven too far positive with respect to the cathode of such tube. The tube 62 is connected as a cathode follower such that its cathode tends to be driven positive by the positive voltage from the tube 60 and the voltage of the cathode of the tube 62 is applied to a terminal of the integrating capacitor $C_1$ which is remote from the control grid of the integrator tube 60 and tends to drive such control grid positive in opposition to the negative potential from the diode 52. The gain of the tube 60 is sufficient that the potential of the control grid of the tube 60 remains very nearly constant but each pulse 30 produces an increment of charge on the capacitor $C_1$. The cathode of the output tube 62 thus becomes positive in increments so that its output voltage is of the form shown at 68 adjacent the tube 62. That is to say, each pulse 30 produces an increase of the output voltage of the tube 62 which is proportional to the amplitude of such pulse so as to provide the integrating operation referred to above.

The capacitor $C_2$ is charged to essentially the negative peak amplitude of each pulse 30 because the action of the integrator tubes 60 and 62 is to pass a current through capacitor $C_1$, diode 52, capacitor $C_2$, and transistor 28 while the grid voltage of tube 60 is pulled negative an amount insignificant compared with the pulse amplitude. Thus electrons flow from the left side of capacitor $C_2$ only until the integrator has supplied capacitor $C_2$ through capacitor $C_1$ with a full charge equal to the amplitude of pulse 30. Current flow then ceases in capacitor $C_2$ even though pulse 30 may not have ended. In this manner the capacitance of capacitor $C_2$ and the amplitude of pulse 30 precisely determine the amount of charge stored in capacitor $C_1$ during each input pulse.

The relationship between the capacitances of capacitors $C_1$ and $C_2$, and the voltage amplitude of each pulse 30, and the corresponding integrator output voltage increments is:

$$e = \frac{Ec_2}{c_1}$$

where, $e$ = an increment of integrator output voltage 68 and, $E$ = peak voltage of input pulse 30

At the end of each pulse 30 the input end of capacitor $C_2$ is suddenly returned to ground. Due to the polarity of the charge in capacitor $C_2$ its right end connected to the plate of diode 54 becomes positive with respect to ground causing diode 54 to conduct away the charge to ground. Diode 52 does not conduct because its cathode becomes positive with respect to its plate. The increment of charge stored in capacitor $C_1$ is added so that an output waveform 68 resembling a staircase results.

In the case in which an integrating excursion is to have 360 increments so as to follow one full rotation of a rotating member in one degree increments, the ratio $c_2/c_1$ would be selected to divide the total allowable excursion of the integrator output by 360. As an example:

Let $E_T$, be the total integrator excursion—140 volts
Let E, be the input pulse amplitude 30—10 volts Then $e$, the integrator voltage increments $= \frac{140}{360}$ and since $$e = \frac{Ec_2}{c_1}$$

then $$\frac{C_2}{C_1} = \frac{e}{E} = \frac{140}{360} \times \frac{1}{10} = 0.039$$

Thus instead of using adjustable capacitors, it is possible and many times preferable to choose a convenient ratio for $c_2/c_1$ such as 0.04 and make the final minor adjustments by making E variable.

The output voltage of the tube 62 is employed to stop the integrating operation when such voltage reaches a predetermined value. A portion of the positive integrated voltage on the cathode of the tube 62 is impressed upon the control grid of a cathode follower tube 70 shown at the lower portion of Fig. 1 from the tap of a potentiometer 71 in the cathode circuit of the tube 62. The tube 70 is connected as a cathode follower and its output voltage is impressed upon the control grid of another tube 72 also connected as a cathode follower after a short time delay provided by the charging time of the capacitor 72' connected between the cathode of the tube 70 and ground. The output of the tube 70 is an increasing positive voltage as the output voltage of the tube 62 increases in a positive direction. The output voltage of the tube 72 is impressed upon the control grid of the tube 38 through a stability control potentiometer 73. When the control grid of the tube 38 is carried above cut off by such voltage, the tube again conducts to bias the tube 42 to cut off as explained above. The resulting non-conducting condition of the tube 42 causes the voltage on the plate thereof to become more positive to thereby cause the diodes 56 and 58 to become conducting. The capacitor $C_1$ discharges to ground through the diode 56 and through the resistor 74 in the anode circuit of the tube 42. The output voltage of the tube 62 drops to its normal or initial value which may be considered the zero value of the integrated voltage and the entire circuit is conditioned for the receipt of another trigger pulse 48 on the control grid of the tube 38 to initiate other integrating operations. The trigger circuit is thus again in its initial or first stable condition.

In the first stable condition of the bi-stable circuit, the output voltage of the tube 62 is slightly negative with respect to ground. There is electron flow through disconnect diode 56 and the resistor 74 to ground. This maintains the plate of the tube 42 slightly negative even though such plate is connected to a source of positive potential through a resistor 76, the resistor 76 being sufficiently high relative to the resistor 74 that substantially all of the voltage drops from the source of positive potential is across such resistor 76. Since the plate of the diode 58 remains slightly negative, the control grid of the tube 60 remains slightly negative during the first stable condition of the bi-stable circuit to provide the class A operation of tube 60 referred to above.

The output voltage of the tube 62 is delivered to a sweep amplifier 78. The sweep amplifier will ordinarily amplify and convert such output voltage to a push-pull voltage which may be applied to the horizontal deflection plates 80 of a cathode ray oscilloscope tube. Any dynamic function such as pressure, ignition timing, torque or vibration obtained from a suitable transducer (not shown), can be supplied as a push-pull voltage to the terminals of the vertical amplifier 82 to produce a vertical deflection voltage proportional to such function on the vertical deflection plates 83 of the cathode ray tube. At the same time, the voltage on the horizontal deflection plates moves the cathode ray horizontally a distance accurately proportional to the displacement of the drum 10 from a predetermined position determined by the position of the one revolution marker on the drum 10.

The operation of the apparatus of the present invention should be apparent from the above description. One degree magnetic markers 18 on the periphery of the drum 10 induce one degree voltage pulses 20 in the pickup element 17. Such one degree pulses are amplified by the transistors 22 and 24 and are converted to square wave one degree pulses 30 of standard amplitude in the saturation amplifier provided by the transistor 26. The pulses 30 are delivered to an integration circuit by the emitter follower transistor 28 through a coupling capacitor $C_2$.

A trigger pulse 32 is induced in the pickup 16 from a trigger marker 19 on the drum 10 and is amplified by the transistor 34 and by the trigger amplifier 36. Such pulse is applied through the coupling capacitor 46 as a negative pulse to a bi-stable circuit including the tubes 38, 40 and 42 to cause such circuit to change from a first stable condition to a second stable condition. The trigger circuit later returns to its first stable condition such that it has a voltage output of the form shown at 44. In the first stable condition of the bi-stable circuit, the disconnect diodes 56 and 58 are conducting and the capacitor $C_1$ has been discharged through the resistor 74. In the second stable condition of the bi-stable circuit, the plates of the diodes 56 and 58 are carried negative so that the diodes become non-conducting. Under these conditions, pulses 30 delivered through the coupling capacitor $C_2$ and diode 52 to the grid of the tube 60 tend to drive such grid negative but the gain of the tube 60 is such that positive feedback to the plate of such tube through the cathode follower tube 62 and capacitor $C_1$ holds the potential of such grid substantially constant. The result is the building up of a charge on the capacitor $C_1$ as the output voltage on the cathode of the tube 62 becomes increasingly positive. Such charge on the capacitor $C_1$ is proportional to the sum of the amplitude of the pulses 30 delivered to the integrating circuit. When the voltage on the cathode of the output tube 62 reaches a predetermined value, the control grid of the tube 38 is driven sufficiently positive through the circuit including the tube 70 and 72 to cause the bi-stable circuit to be returned to its initial stable condition, thus rendering the diodes 56 and 58 conducting to discharge the capacitor $C_1$. As long as the bi-stable circuit remains in its first stable condition, no charge builds up on the capacitor $C_1$.

The value of the positive output voltage on the cathode of the output tube 62 which will cause the bi-stable circuit to return from its second stable condition to its first stable condition can be varied by varying the adjustment of potentiometer 71. The number of pulses required to produce a given output voltage is proportional to the ratio of such given output voltage to the voltage of each individual pulse 30 and is also proportional to the ratio of the capacitances of the capacitors $C_1$ and $C_2$. The number of pulses 17 or 30 in each integrated output voltage can therefore be adjusted either by adjusting the potentiometer 71 or by adjusting the capacitance of either $C_1$ or $C_2$. For example, $C_2$ can be made variable for making small changes in the number of pulses in each horizontal sweep voltage. Also other capacitors of different capacitance, such as capacitor $C'_1$, can be substituted for capacitor $C_1$ by a switch 86 for making major changes in such number of pulses. In any event, one degree pulses of varying amplitude derived from a rotating element having a range of speeds varying, for example, from 30 to 5000 r.p.m. can be converted to pulses of uniform amplitude by the one degree marker pulse amplifier illustrated. Thus the output of the pickup 17 may vary from approximately 20 millivolt to approximately 3 volts while the saturation amplifier continues to produce 9-volt square wave negative output pulses.

In a practical application of the device of the present invention, the drum 10 with its bearing structure and the transistors 22, 24, 26, 28 and 34 with their associated circuit components may form a unitary assemblage positioned in a separate casing, while the remainder of the circuit may form a part of the circuits of a special cathode ray oscilloscope, although alternatively such circuits as the trigger amplifier circuit, trigger circuit, and pulse integrating circuit may be positioned in individual casings or in a single casing separate from the oscilloscope or any desired assemblage of such circuits may form a plug-in unit for an oscilloscope. In the specific example shown in the drawings, the value of capacitance are in microfarads except where otherwise indicated. In such example, the tubes 40 and 48 may each be a half of a 6BQ7A, the tube 42 may be a 6AU6, the tubes 52 and 54 as well as the tubes 56 and 58 may each be a half of a 6AL5, the tubes 60 and 62 may each be a half of a 6AN8 and the tubes 70 and 72 may each be a half of a 12AT7. A saturation amplifier has been shown for forming the pulses 30 but it will be apparent that it is possible to employ a bi-stable circuit for the same purpose.

While I have disclosed the preferred embodiment of my invention, it should be understood that the details thereof may be varied and that the scope of the invention is to be determined by the following claims.

I claim:

1. Apparatus for producing an integrated voltage which is proportional to the distance moved by a movable member from a predetermined position, which apparatus comprises means for producing voltage pulses including a plurality of markers carried by said member and equally spaced therealong in the direction of movement of said member and pickup means adjacent the path of movement of said markers, means for amplifying and standardizing said pulses to produce standard pulses of constant amplitude, integrating means for adding the constant amplitudes of a plurality of said standard pulses to produce said integrated voltage and means for initiating the operation of said integrating means when said movable member is in said predetermined position.

2. Apparatus for producing an integrated voltage which is proportional to the distance moved by a movable member from a predetermined position, which apparatus comprises means for producing voltage pulses including a plurality of markers carried by said member and equally spaced therealong in the direction of movement of said member and pickup means adjacent the path of movement of said markers, means for amplifying and standardizing said pulses including an electronic device operated between cutoff and saturation by said voltage pulses to produce standard pulses of constant amplitude, integrating means for adding the constant amplitudes of a plurality of said standard pulses to produce said integrated voltage and means for initiating the operation of said integrating means when said movable member is in said predetermined position.

3. Apparatus for producing an integrated voltage which is proportional to the distance moved by a movable member from a predetermined position, which apparatus comprises means for producing voltage pulses including a plurality of markers carried by said member and equally spaced therealong in the direction of movement of said member and pickup means adjacent the path of movement of said markers, means for amplifying and standardizing said pulses including a grounded emitter transistor biased for saturation current and driven to cut off by said voltage pulses to produce standard pulses of constant amplitude, integrating means for adding the constant amplitudes of a plurality of said standard pulses to produce said integrated voltage and means for initiating the operation of said integrating means when said movable member is in said predetermined position.

4. Apparatus for producing a sweep voltage proportional to the distance moved by a movable member from a predetermined position, which apparatus comprises an element for attachment to said member for movement therewith and having markers thereon spaced from each other in the direction of movement of said element, pickup means adjacent said element for producing a voltage pulse for each marker passing said pickup means, a pulse amplifying and standardizing circuit receiving the resulting series of voltage pulses for producing therefrom a series of output pulses corresponding to said voltage pulses and of constant amplitude, an integrating circuit for adding the constant amplitudes of a plurality of said output pulses to produce said sweep voltage, and means initiating the operation of said integrating circuit when said movable member is in said predetermined position.

5. Apparatus for producing a sweep voltage proportional to the distance moved by a movable member from a predetermined position, which apparatus comprises an element for attachment to said member for movement therewith and having a coating of magnetic material with magnetic markers therein spaced from each other in the direction of movement of said element, magnetic pickup means adjacent said element for producing a voltage pulse for each marker passing said pickup means, a pulse amplifying and standardizing circuit receiving the resulting series of voltage pulses for producing therefrom a series of output pulses corresponding to said voltage pulses and of constant amplitude, and an integrating circuit for adding the constant amplitudes of a plurality of said output pulses to produce said sweep voltage, and means initiating the operation of said integrating circuit when said movable member is in said predetermined position.

6. Apparatus for producing an integrated voltage which is proportional to the distance moved by a movable member from a predetermined position, which apparatus comprises means for producing voltage pulses including a plurality of markers carried by said member and equally spaced therealong in the direction of movement of said member and pickup means adjacent the path of movement of said markers, means for amplifying and standardizing said pulses to produce standard pulses of constant amplitude, means for integrating said standard pulses to produce said integrated voltage, means for producing a trigger pulse including a trigger marker also carried by said movable member and a pickup adjacent the path of movement of said trigger marker, means controlled by said trigger pulse for initiating the operation of said integrating means and means responsive to said integrated voltage when said integrated voltage reaches a predetermined value for discontinuing the operation of said integrating means and for reducing said integrated voltage to its initial value.

7. Apparatus for producing an integrated voltage which is proportional to the distance moved by a movable member from a predetermined position, which apparatus comprises means for producing voltage pulses including a plurality of magnetic markers carried by said member and equally spaced therealong in the direction of movement of said member and magnetic pickup means adjacent the path of movement of said markers, means for amplifying and standardizing said pulses to produce standard pulses of constant amplitude, means for integrating said standard pulses to produce said integrated voltage, means for producing a trigger pulse including a magnetic trigger marker also carried by said movable member and a magnetic pickup adjacent the path of movement of said trigger marker, means controlled by said trigger pulse for initiating the operation of said integrating means and means responsive to said integrated voltage when said integrated voltage reaches a predetermined value for discontinuing the operation of said integrating means and for reducing said integrated voltage to its initial value.

8. Apparatus for producing a sweep voltage which increases at a rate proportional to the angle of rotation of a rotatable member from a predetermined position, which apparatus comprises a rotatable drum having a coating of magnetic material on its periphery, said coating having a series of magnetic markers therein which are equally spaced around said periphery, a magnetic pickup supported adjacent said markers, means for attaching said drum to said member for rotation therewith to produce a series of voltage pulses in said pickup, an amplifying circuit for producing amplified pulses from said voltage pulses, a pulse standardizing circuit including an electron device operated between saturation and cutoff by said amplified pulses for producing output pulses of constant amplitude corresponding to each of said voltage pulses, an integrating circuit for integrating said output pulses to provide said sweep voltage, said sweep voltage having an initial and a maximum value, a magnetic trigger marker spaced laterally from said series of markers, a second magnetic pickup supported adjacent the path of movement of said trigger marker to have a voltage pulse produced therein by said trigger marker, a bi-stable circuit for controlling said integrating circuit, an amplifying circuit for amplifying and delivering said trigger pulses to said bi-stable circuit for causing said bi-stable circuit to convert from a first stable condition to a second stable condition and simultaneously initiate an integrating operation of said integrating circuit, and means responsive to said maximum value of said sweep voltage for causing said bi-stable circuit to assume its first stable condition to discontinue the integrating operation of said integrating circuit and cause return of said sweep voltage to its initial value.

9. Apparatus for producing an integrated electrical quantity which is proportional to the relative distance moved by relatively movable members from a predetermined position relative to each other, which apparatus comprises means for producing electric pulses including a plurality of markers carried by one of said members and equally spaced therealong in the direction of relative movement of said members and sensing means carried by the other of said members adjacent said markers, means for amplifying and standardizing said pulses to produce resulting pulses each having a constant quantity, integrating means for adding the constant quantities of a plurality of said resulting pulses to produce said integrated quantity, and means for initiating the operation of said integrating means when said movable members are in said predetermined position relative to each other.

10. Apparatus for producing an integrated electrical quantity which is proportional to the relative angular distance moved by relatively angularly movable members from a predetermined position relative to each other about a common axis which apparatus comprises means for producing electric pulses including a plurality of markers carried by one of said members and equal circumferentially spaced thereon about said axis and sensing means carried by the other of said members adjacent said markers, means for amplifying and standardizing said pulses to produce resulting pulses each having a constant quantity, integrating means for adding the constant quantities of a plurality of said resulting pulses to produce said integrated value, and means for initiating the operation of said integrating means when said movable members are in said predetermined position.

References Cited in the file of this patent

UNITED STATES PATENTS

| | | |
|---|---|---|
| 2,563,256 | Lord et al. | Aug. 7, 1951 |
| 2,782,626 | Jochum et al. | Feb. 26, 1957 |
| 2,810,080 | Trousdale | Oct. 15, 1957 |